United States Patent
Kuo

(10) Patent No.: US 7,406,203 B2
(45) Date of Patent: *Jul. 29, 2008

(54) IMAGE PROCESSING METHOD, SYSTEM, AND APPARATUS FOR FACILITATING DATA TRANSMISSION

(75) Inventor: Shih-Zheng Kuo, Taipei (TW)

(73) Assignee: Transpacific IP, Ltd., Taipei (TW)

( * ) Notice: Subject to any disclaimer, the term of this patent is extended or adjusted under 35 U.S.C. 154(b) by 282 days.

This patent is subject to a terminal disclaimer.

(21) Appl. No.: 11/326,709

(22) Filed: Jan. 5, 2006

(65) Prior Publication Data

US 2006/0133675 A1    Jun. 22, 2006

Related U.S. Application Data

(63) Continuation of application No. 10/211,268, filed on Aug. 5, 2002, now Pat. No. 7,085,421.

(51) Int. Cl.
*G06K 9/36* (2006.01)
(52) U.S. Cl. .................................... 382/232
(58) Field of Classification Search ......... 382/232–252, 382/166, 169; 358/426.01–426.16; 341/50–51, 341/67, 84, 97; 708/200, 277, 512, 517, 708/505, 204; 709/247, 249
See application file for complete search history.

(56) References Cited

U.S. PATENT DOCUMENTS

| 5,365,465 | A |   | 11/1994 | Larson |
| 5,708,729 | A | * | 1/1998  | Adams et al. ............... 382/169 |
| 5,933,360 | A | * | 8/1999  | Larson ....................... 708/512 |
| 6,345,285 | B1 |  | 2/2002 | Nagao et al. |
| 6,721,773 | B2 |  | 4/2004 | Jennings, III |
| 6,788,224 | B2 |  | 9/2004 | Leanza |

\* cited by examiner

*Primary Examiner*—Sherali Ishrat
(74) *Attorney, Agent, or Firm*—Stolowitz Ford Cowger LLP

(57) ABSTRACT

An image processing method for facilitating data transmission is provided. An image compression method is performed to convert X-bits binary digital signals to a binary compressed data in a floating-point form of $(1.n)*2^m$. Bit m represents the first bit with logic level "1" of the X-bits binary digital signals, and n represents the bits taken from the X-bits binary digital signals after the bit m. The binary compressed data in the floating-point form of $(1.n)*2^m$ is outputted with a sequence of binary number representing a set of (m, n). The latter n bits of the sequence of binary numbers are consisted of the n bits of the X-bits digital signal. Therefore, by the present image compression method, the transmission amount of image data is reduced. The transmission time of image data and the volume of a memory for storing the image data are also reduced.

28 Claims, 3 Drawing Sheets

IMAGE PROCESSING METHOD, SYSTEM, AND APPARATUS FOR FACILITATING DATA TRANSMISSION

This application is a continuation of U.S. patent application Ser. No. 10/211,268, entitled "IMAGE PROCESSING METHOD FOR FACILITATING DATA TRANSMISSION" and filed on Aug. 5, 2002 now U.S. Pat. No. 7,085,421.

BACKGROUND OF THE INVENTION

1. Field of the Invention

The present invention relates to an image processing method, and more particularly, to an image compression method for binary digital signals.

2. Description of the Prior Art

Without image compression, the transmission of images requires an unacceptable bandwidth in many applications. As a result, methods of compressing images have been the subject of numerous research publications. Image compression schemes convert an image consisting of a two-dimensional array of pixels into a sequence of bits, which are to be transmitted over a communication link. Each pixel represents the intensity of the image at a particular location therein. The transmission link may be an ordinary telephone line.

Consider an image comprising a gray-scale representation of a photograph at a resolution of 1000×1000 lines. Each pixel typically consists of 8 bits, which are used to encode 256 possible intensity levels at the corresponding point on the photograph. Hence, without compression, transmission of the photograph requires that 8 million bits be sent over the communication link. A typical telephone line is capable of transmitting about 9600 bits per second; hence the picture transmission would require more than 10 minutes. Transmission times of this magnitude are unacceptable.

As a result, image compression systems are needed to reduce the transmission time. It will also be apparent to those skilled in the art that image compression systems may also be advantageously employed in image storage systems to reduce the amount of memory needed to store one or more images.

Image compression involves transforming the image to a form, which can be represented in fewer bits without losing the essential features of the original images. The transformed image is then transmitted over the communication link and the inverse transformation is applied at the receiver to recover the image. The compression of an image typically requires two steps. In the first step, the image is transformed to a new representation in which the correlation between adjacent pixels is reduced. This transformation is usually completely reversible, that is, no information is lost at this stage. The number of bits of data needed to represent the transformed image is at least as large as that needed to represent the original image. The purpose of this transformation is to provide an image representation, which is more ideally suited to known compression methods.

In the second step, referred to as quantization, each pixel in the transformed image is replaced by a value, which is represented in fewer bits, on average, than the original pixel value. In general, the original gray scale is replaced by a new scale, which has coarser steps and hence can be represented in fewer bits. The new gray scale is calculated from the statistical distribution of the pixel values in the transformed image.

The quantized image resulting from the above two steps is often further coded for transmission over the communication link. This coding is completely reversible. Its purpose is to provide a more compact representation of the quantized picture. At the other end of the communication link, the coded image is decoded, the quantization transformation is reversed and the inverse of the first transformation is performed on the resulting image to provide a reconstructed image.

However, the known image compression method usually utilizes a complicated encoding and decoding circuitry to attain the more compact image data for transmission. The coding/decoding process is also complicated. Moreover, the image transformation circuitry is a significant cost factor in image compression apparatuses. The required computational expense clearly depends on the image transformation selected. Hence, an image compression method, which requires less computation than the prior image compression method, would be advantageous.

SUMMARY OF THE INVENTION

It is one objective of the present invention to provide an image processing method for facilitating data transmission, which performs an image compression method for converting X-bits binary digital signals to a binary compressed data in a floating-point form of $(1.n)*2^m$, in which bit m represents the first bit with logic level "1" of the X-bits binary digital signals, and n represents the bits taken from the X-bits binary digital signals after the bit m. The binary compressed data in the floating-point form of $(1.n)*2^m$ is outputted with a sequence of binary number representing a set of (m, n). The latter n bits of the sequence of binary numbers are consisted of the n bits of the X-bits binary digital signals. Therefore, the transmission amount of image data is reduced, and the transmission rate of the image data is facilitated.

It is another objective of the present invention to provide an image processing method for facilitating data transmission, which implements a simple compression method to convert X-bits binary digital signals to a binary compressed data in a floating-point form of $(1.n)*2^m$. The complicated encoding and decoding processes for image compression and processing circuits therefore are omitted by the present compression method.

It is a further objective of the present invention to provide an image processing method, which performs a bit-enhanced technology to compensate decompressed image data to increase the accuracy of the recovery of the image data.

It is still further an objective of the present invention to provide an image processing method, which uses a simple image compression method to obtain the purpose of making the recovered image with low grayscale level non-distorted and the recovered image with high grayscale level noise-eliminated.

In order to achieve the above objectives of this invention, the present invention provides an image processing method for facilitating data transmission. The present method comprises capturing an image signal from an object with an image capture device, and providing the image signal to an analog-to-digital converter for converting the image signal to X-bits binary digital signals consisted of bit (X-1) to bit 0, wherein X is a natural number. Then, the X-bits binary digital signals is transmitted to image processing means for compressing the X-bits binary digital signals to a binary compressed data in a floating-point form of $(1.n)*2^m$. Bit m represents the first bit with logic level "1" of the X-bits binary digital signals, and n represents the bits taken from the X-bits binary digital signals after the bit m, n is a non-negative integer. The binary compressed data in the floating-point form of $(1.n)*2^m$ is outputted with a sequence of binary number representing a set of (m, n), and the latter n bits of the sequence of binary numbers are consisted of the n bits of the X-bits binary digital signals. The binary compressed data is then transmitted to memory means for storage. By the present image compression method, the transmission amount of image data is reduced. The transmission rate of image data is facilitated and the volume of a memory for storing the image data is also reduced.

BRIEF DESCRIPTION OF THE DRAWINGS

The objectives and features of the present invention as well as advantages thereof will become apparent from the following detailed description, considered in conjunction with the accompanying drawings.

DESCRIPTION OF THE PREFERRED EMBODIMENTS

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams and flowcharts.

Figure 1:
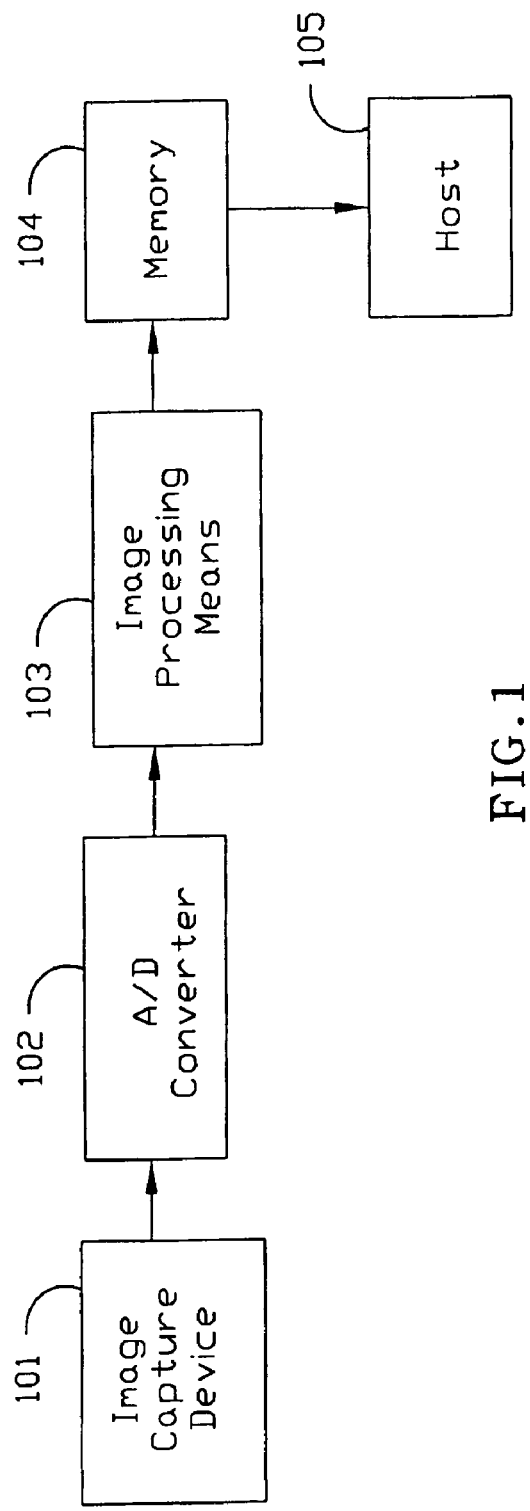
FIG. 1 is a block diagram of an image processing system implementing image compression methods of the present invention.
Figure 2:
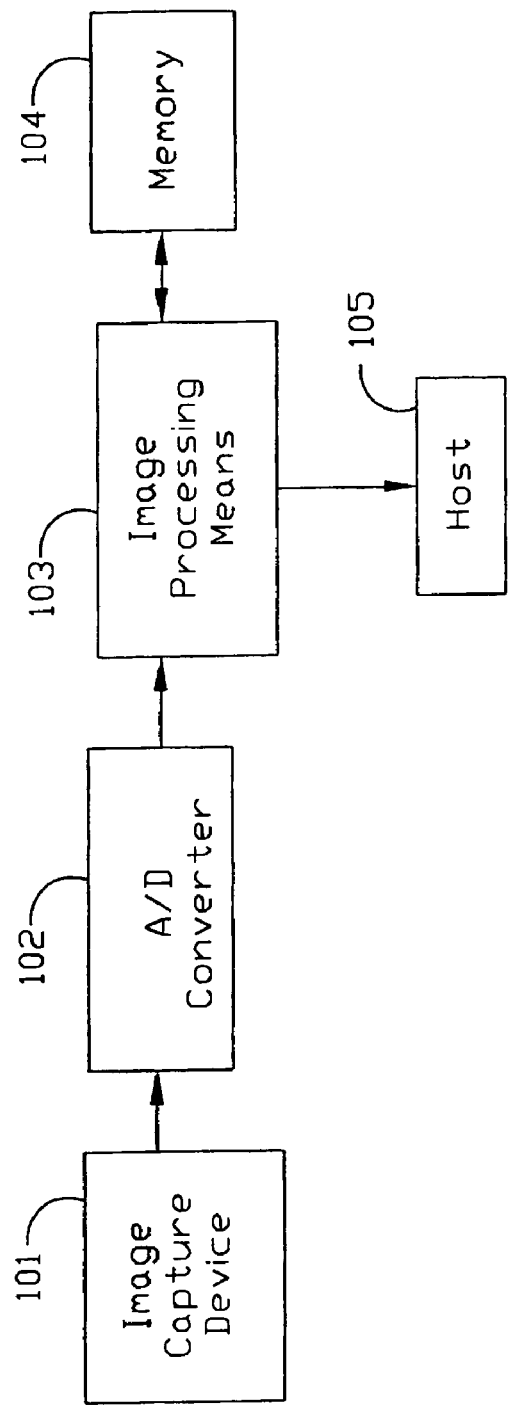
FIG. 2 is a block diagram of another image processing system implementing the image compression methods of the present invention.
Figure 3:
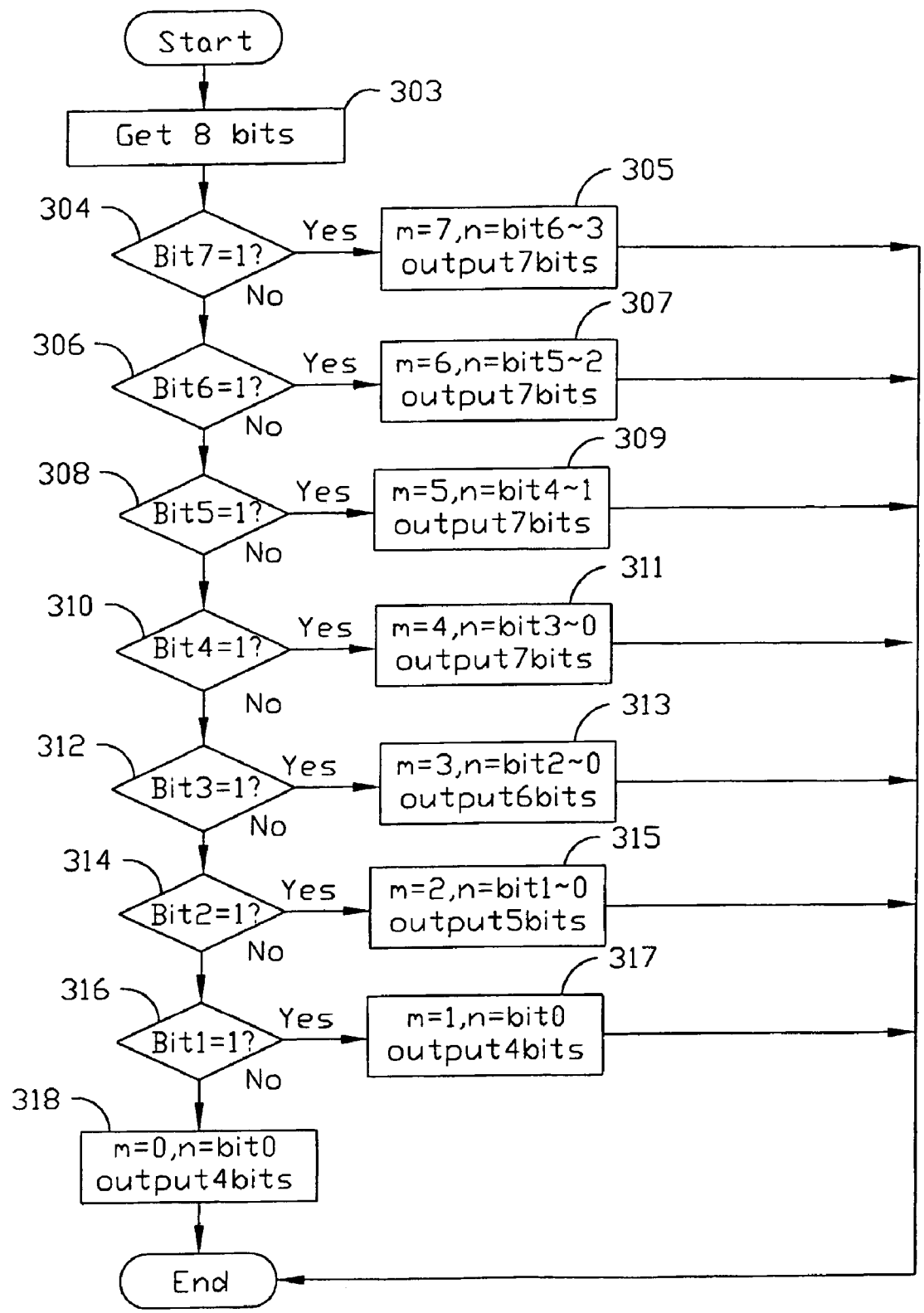
FIG. 3 is a flow chart of one embodiment of the present invention illustrating the present image compression method.
Figure 4:
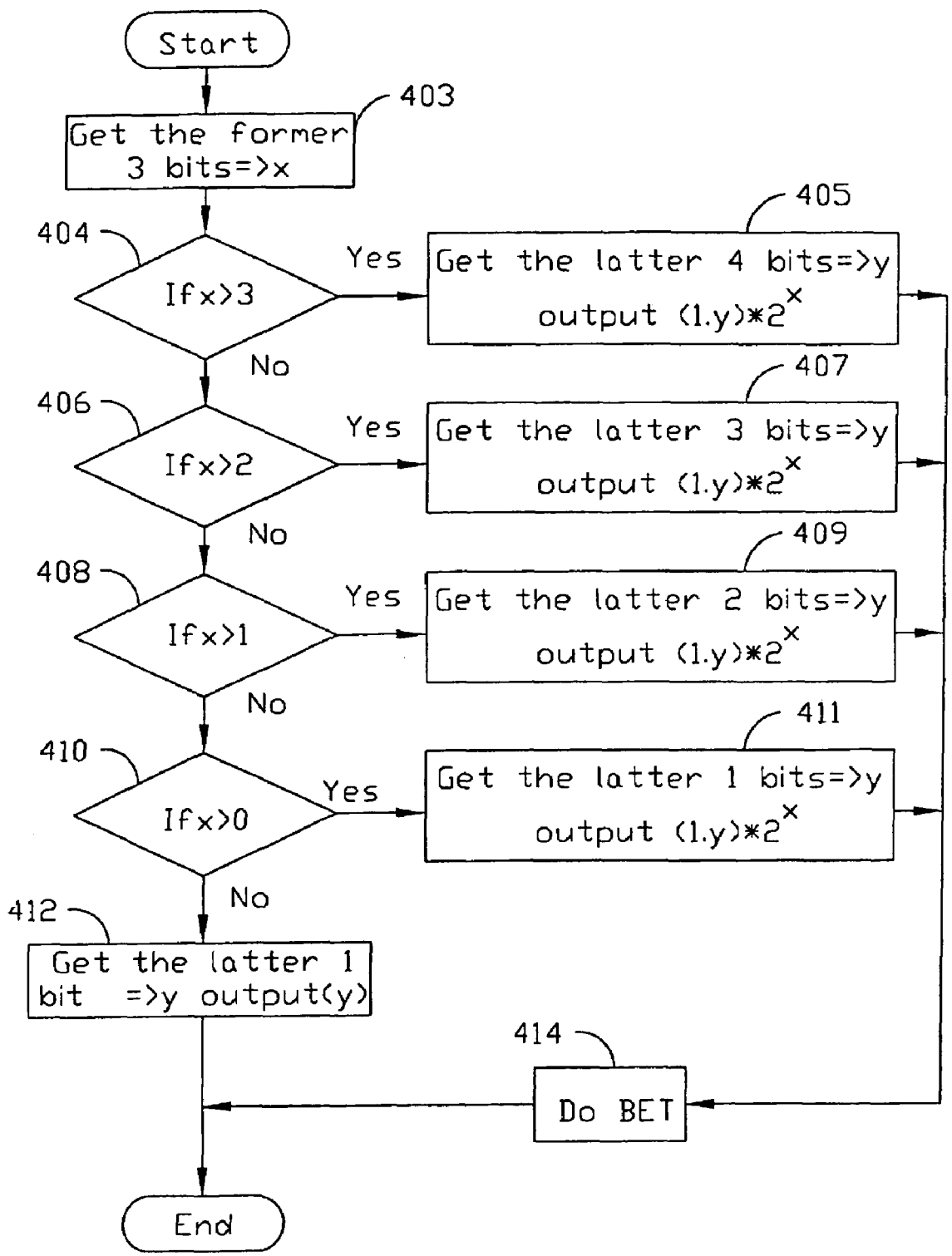
FIG. 4 is a flow chart for illustrating an image decompression process of the present invention.

FIG. 1 is a block diagram of an image processing system implementing image compression methods of the present invention, and FIG. 2 is a block diagram of another image processing system implementing the image compression methods of the present invention. FIG. 3 is a flow chart of one embodiment of the present invention illustrating the present image compression method. FIG. 4 is a flow chart for illustrating an image decompression process of the present invention.

Initially, referring to FIG. 1, an image is captured from an object by an image capture device 101, e.g. charge-coupled device (CCD), CMOS sensor and the like capable of converting an image signal to an electric signal. The image signal represents intensity of a pixel of the image captured by the image capture device 101. The electric signal is then provided to an A/D converter (analog-to-digital converter) 102 to convert to X-bits binary digital signals, which are consisted of binary values from bit (X-1) to bit 0. The X-bits binary digital signals are transmitted to image processing means 103 for being compressed to a binary compressed data in a floating-point form of $(1.n)*2^m$, wherein bit m represents the first bit with logic level "1" of the X-bits binary digital signals, and n represents the bits taken from the X-bits binary digital signals after the bit m, n is a non-negative integer. Hence, by image processing means 103, e.g. an image processing circuit, the X-bits binary digital signals are converted to the binary compressed data in the floating-point form of $(1.n)*2^m$, which is outputted with a sequence of binary number, (x x x ..., x), representing a set of (m, n). The latter n bits of the sequence of binary numbers are consisted of the n bits of the X-bits binary digital signals. The binary compressed data is then transmitted with the sequence of binary numbers, (x x ..., x), representing the set of (m, n), to a memory 104, e.g. a buffer memory, for storage.

FIG. 3 is a flow chart of one embodiment of the present invention illustrating the image compression process for 8-bits binary digital signals implemented by image processing means 103. The image compression process of the embodiment for 8-bits binary digital signals will be described in detail in the following. In step 303, the 8-bits binary digital signals consisted of binary values from bit 7 to bit 0 is provided to image processing means 103. In step 304, when bit 7 is logic level "1", go to step 305, m is set to 7 and n is assigned from bit 6 to bit 3 of the 8-bits binary digital signals. Then, the 8-bits binary digital signals are converted to a binary compressed data in a floating-point form of $(1.xxxx)*2^7$. The binary compressed data is outputted with 7-bits binary numbers, (1 1 1 x x x x). The former 3 bits of the 7-bits binary numbers represent the value of 7 and the latter 4 bits of the 7-bits binary numbers are consisted of bit 6 to bit 3 of the 8-bits binary digital signals. In step 306, when bit 7 is logic level "0" and bit 6 is logic level "1", go to step 307, m is set to 6 and n is assigned from bit 5 to bit 2 of the 8-bits binary digital signals. Then, the 8-bits binary digital signals are converted to a binary compressed data in a floating-point form of $(1.xxxx)*2^6$. The binary compressed data is outputted with 7-bits binary numbers, (1 1 0 x x x x). The former 3 bits of the 7-bits binary numbers represent the value of 6 and the latter 4 bits of 7-bits binary numbers are consisted of bit 5 to bit 2 of the 8-bits binary digital signals. In step 308, when both of bit 7 and bit 6 are logic level "0", and bit 5 is logic level "1", go to step 309, m is set to 5, and n is assigned from bit 4 to bit 1 of the 8-bits binary digital signals. Then, the 8-bits binary digital signals are converted to a binary compressed data in a floating-point form of $(1.xxxx)*2^5$. The binary compressed data is outputted with 7-bits binary numbers, (1 0 1 x x x x). The former 3 bits of the 7-bits binary numbers represent the value of 5 and the latter 4 bits of 7-bits binary numbers are consisted of bit 4 to bit 1 of the 8-bits binary digital signals. In step 310, when bit 7, bit 6 and bit 5 are logic level "0", and bit 4 is logic level "1", go to step 311, m is set to 4, and n is assigned from bit 3 to bit 0 of the 8-bits binary digital signals. Then, the 8-bits binary digital signals are converted to a binary compressed data in a floating-point form of $(1.xxxx)*2^4$. The binary compressed data is outputted with 7-bits binary numbers, (1 0 0 x x x x). The former 3 bits of the 7-bits binary numbers represent the value of 4 and the latter 4 bits of 7-bits binary numbers are consisted of bit 3 to bit 0 of the 8-bits binary digital signals. In step 312, when bit 7, bit 6, bit 5 and bit 4 are logic level "0", and bit 3 is logic level "1", go to step 313, m is set to 3, n is assigned from bit 2 to bit 0 of the 8-bits binary digital signals. Then, the 8-bits binary digital signals are converted to a binary compressed data in a floating-point form of $(1.xxx)*2^3$. The binary compressed data is outputted with 6-bits binary numbers, (0 1 1 x x x). The former 3 bits of the 6-bits binary numbers represent the value of 3 and the latter 3 bits of the 6-bits binary numbers are consisted of bit 2 to bit 0 of the 8-bits binary digital signals. In step 314, when bit 7 to bit 3 are logic level "0", and bit 2 is logic level "1", go to step 315, m is set to 2, n is assigned from bit 1 to bit 0 of the 8-bits binary digital signals. Then, the 8-bits binary digital signals are converted to a binary compressed data in a floating-point form of $(1.xx)*2^2$. The binary compressed data is outputted with 5-bits binary numbers, (0 1 0 x x). The former 3 bits of the 5-bits binary numbers represent the value of 2 and the latter 2 bits of the 5-bits binary numbers are consisted of bit 2 to bit 0 of the 8-bits binary digital signals. In step 316, when bit 7 to bit 2 are logic level "0", and bit 1 is logic level "1", go to step 317, m is set to 1, and n is assigned bit 0 of the 8-bits binary digital signals. Then, the 8-bits binary digital signals are converted to a binary compressed data in a floating-point form of $(1.x)*2^1$. The binary compressed data is outputted with 4-bits binary numbers, (0 0 1 x). The former 3 bits of the 4-bits binary numbers represent the value of 1 and the last bit of the 4-bits binary numbers is bit 0 of the 8-bits binary digital signals. In step 318, when bit 7 to bit 1 is logic level "0", and bit 0 is logic level "1", m is set to 0, and n is assigned bit 0 of the 8-bits binary digital signals. Then, the 8-bits binary digital signals are converted to a binary compressed data in a floating-point form of $(1.x)*2^0$. The binary compressed data is outputted with 4-bits binary numbers, (0 0 0 x). The former 3 bits of the 4-bits binary numbers represent the value of 0 and the last bit of the 4-bits binary numbers is bit 0 of the 8-bits binary digital signals.

According to the embodiment of the present invention, the present invention provides a dynamic compression method, in which when m≧4, the binary compressed data is outputted with 7-bit binary numbers, and when m≦3, the binary compressed data can be outputted with fewer bits, such as 6 bits, 5 bits and 4 bits. Hence, transmission amount of the image data transmitted to the memory 104 and the host 105 is reduced. The transmission time of the image data is thus decreased, and the volume of the memory 104 for storing the image data is also reduced. However, the present compression method is also suited to compress binary digital signals consisted of 10-bits, 12-bits and 16-bits, etc. And, n is determined according to quality of the image desired.

TABLE I

| Before compression | After compression | Recovery |
|---|---|---|
| 0000,0000 | 000 0 | 0000,0000 |
| 0000,0001 | 000 1 | 0000,0001 |
| 0000,0010 | 001 0 | 0000,0010 |
| 0000,0011 | 001 1 | 0000,0011 |
| 0000,0100 | 010 00 | 0000,0100 |
| 0010,1000 | 101 0100 | 0010,1000 |
| 0010,1001 | 101 0100 | 0010,1000 |
| 0010,1010 | 101 0101 | 0010,1010 |
| 0100,0000 | 110 0000 | 0100,0000 |
| 0100,0010 | 110 0000 | 0100,0000 |
| 0100,0100 | 110 0001 | 0100,0100 |
| 1111,1011 | 111 1111 | 1111,1000 |
| 1111,1100 | 111 1111 | 1111,1000 |
| 1111,1101 | 111 1111 | 1111,1000 |
| 1111.1110 | 111 1111 | 1111,1000 |

The above table I lists respective results before compression, after compression and after recovery for 8-bits binary digital signals. The 7-bits binary compressed data in table I are generated from the compression method according to the embodiment illustrated in FIG. 3. The value of m is represented by the former 3 bits of the 7-bit binary compressed data and n is the latter 4 bits of the 7-bit binary compressed data. As shown in table I, the higher the grayscale level of the pixel is, the higher the distortion of the recovered image data is. Thus, a decompression method of the present invention utilizing a bit-enhanced technology (BET) is provided to compensate loss of the recovered image data, which is illustrated in FIG. 4.

Referring to FIG. 1 again, the binary compressed data from the compression method of FIG. 3 and stored in the memory 104 is then outputted to a host 105 for further processing, such as decompressing to recover the original 8-bits binary digital signals and print out. The decompression method of the present invention illustrated in FIG. 4 is implemented in the host 105. In step 403, converting the former 3 bits of the 7-bits binary compressed data to an "x" value. In step 404, when x>3, and x is a non-negative integer, go to step 405, converting the latter 4 bits of the 7-bits binary compressed data to an "y" value. In accordance with the values of x and y, and the logarithm form $(1.y)*2^x$, recovering the 7-bits binary compressed data to the original 8-bits binary digital signals. Then, go to step 414, a bit-enhanced method is applied to the recovered image data from step 405. The bit-enhanced method comprises steps of (a) calculating a first average of a plurality of neighboring pixels around the pixel corresponding to the recovered 8-bits binary digital signals; and (b) calculating a second average of the first average and the pixel. As a result, the compensated data of the pixel is obtained. In step 406, when x>2, go to step 407, converting the latter 3 bits of the 6-bits binary compressed data to an "y" value. In accordance with the values of x and y, and the logarithm form $(1.y)*2^x$, recovering the 6-bits binary compressed data to the original 8-bits binary digital signals. Then, go to step 414, the bit-enhanced method is applied to the recovered image data from step 407. In step 408, when x>1, go to step 409, converting the latter 2 bits of the 5-bits binary compressed data to an "y" value. In accordance with the values of x and y, and the logarithm form $(1.y)*2^x$, recovering the 5-bits binary compressed data to the original 8-bits binary digital signals. Then, go to step 414, the bit-enhanced method is applied to the recovered image data from step 409. In step 410, when x>0, go to step 411, converting the latter 1 bit of the 4-bits binary compressed data to an "y" value. In accordance with the values of x and y, and the logarithm form $(1.y)*2^x$, recovering the 4-bits binary compressed data to the original 8-bits binary digital signals. Then, go to step 414, the bit-enhanced method is applied to the recovered image data from step 411. In step 412, when x=0, converting the last bit of the 4-bit binary compressed data to an "y" value. In accordance with the values of x and y, and the logarithm form $(1.y)*2^x$, recovering the 1-bits binary compressed data to the original 8-bits binary digital signals.

FIG. 2 is a block diagram of another image processing system implementing the present image compression method, in which the binary compressed data stored in the memory 104 is accessed by image processing means 103, and then outputted to the host 105 for further processing, such as decompressing to recover the original image data. Since the data communication between image processing means 103, the memory 104 and the host 105 is in the form of the binary compressed data, the transmission amount of the image data between them is reduced, and the transmission time of the image data is therefore reduced.

With reference to table I again, the recovered image data of a pixel with a low grayscale level is less distorted, and the recovered image data of a pixel with a higher grayscale level is more distorted. Therefore, a purpose for making the recovered image of a black-area image, i.e. image with low grayscale levels, non-distorted, and the recovered image of a white-area image, i.e. image with high grayscale levels, noise-eliminated, is obtained in accordance with the present image compression method of FIG. 3.

The embodiments are only used to illustrate the present invention, not intended to limit the scope thereof. Many modifications of the embodiments can be made without departing from the spirit of the present invention.

What is claimed is:

1. A system comprising:
   an image capture device capable of generating a signal based at least in part on an image of an object;
   an image processor capable of converting an X-bit binary signal to a binary compressed data in a form of $(1.n)*2^m$, wherein said X-bit binary signal is based at least in part on the generated signal, wherein X comprises a natural number, and wherein a bit m represents the first bit with logic level "1" of said X-bit binary signal, and n represents the bits taken from said X-bit binary signal after the bit m, and wherein n comprises a non-negative integer.

2. The system of claim 1, further comprising an analog to digital converter capable of converting said generated signal to said X-bit binary signal.

3. The system of claim 1, wherein said binary compressed data comprises a sequence of binary numbers representing a set of (m, n) and a latter n bits of the sequence of binary numbers comprising said n bits of said X-bit binary signal.

4. The system of claim 3, wherein said image processor is further capable of storing said binary compressed data in a memory.

5. The system of claim 4, further comprising a host, wherein said host is capable of accessing said binary compressed data from said memory at least in part for decompressing said binary compressed data to recover said X-bit binary signal.

6. The system of claim 5, wherein decompressing said binary compressed data comprises:
converting one or more bits of said binary compressed data before a latter n bits of said binary compressed data to the value of m; and
recovering said binary compressed data to said X-bit binary signals in accordance with said latter n bits, the value of m and the algorithm form of $(1.n)*2^m$.

7. The system of claim 6, wherein said host is further capable of compensating a pixel corresponding to said X-bits binary signal with a bit-enhanced method at least in part by calculating a first average of a plurality of neighboring pixels around said pixel; and calculating a second average of said first average and said pixel.

8. An apparatus comprising:
an image processor capable of converting an X-bit binary signal to a binary compressed data in a form of $(1.n)*2^m$, wherein said X-bit binary signal is based at least in part on the generated signal, wherein X comprises a natural number, and wherein a bit m represents the first bit with logic level "1" of said X-bit binary signal, and n represents the bits taken from said X-bit binary signal after the bit m, and wherein n comprises a non-negative integer.

9. The apparatus of claim 8, wherein said binary compressed data comprises a sequence of binary numbers representing a set of (m, n) and a latter n bits of the sequence of binary numbers comprising said n bits of said X-bit binary signal.

10. The apparatus of claim 9, wherein said image processor is further capable of storing said binary compressed data in a memory.

11. A method, comprising:
converting an X-bit binary signal to a binary compressed data in a form of $(1.n)*2^m$, wherein said X-bit binary signal is based at least in part on a signal generated by an image capture device, wherein X comprises a natural number, and wherein a bit m represents the first bit with logic level "1" of said X-bit binary signal, and n represents the bits taken from said X-bit binary signal after the bit m, and wherein n comprises a non-negative integer.

12. The method of claim 11, wherein said binary compressed data comprises a sequence of binary numbers representing a set of (m, n) and a latter n bits of the sequence of binary numbers comprising said n bits of said X-bit binary signal.

13. The method of claim 12, further comprising storing said binary compressed data in a memory.

14. The method of claim 13, further comprising accessing said binary compressed data from said memory at least in part for decompressing said binary compressed data to recover said X-bit binary signal.

15. The method of claim 14, wherein decompressing said binary compressed data comprises:
converting one or more bits of said binary compressed data before a latter n bits of said binary compressed data to the value of m; and
recovering said binary compressed data to said X-bit binary signals in accordance with said latter n bits, the value of in and the algorithm form of $(1.n)*2^m$.

16. The method of claim 15, further comprising compensating a pixel corresponding to said X-bits binary signal with a bit-enhanced method at least in part by calculating a first average of a plurality of neighboring pixels around said pixel; and calculating a second average of said first average and said pixel.

17. A system comprising:
means for generating a signal based on an image of an object;
means for converting said signal to an X-bit binary signal;
means for compressing said X-bit binary signal into binary compressed data in a form of $(1.n)*2^m$, wherein said X-bit binary signal is based at least in part on a signal generated by an image capture device, wherein X comprises a natural number, and wherein a bit m represents the first bit with logic level "1" of said X-bit binary signal, and n represents the bits taken from said X-bit binary signal after the bit m, and wherein n comprises a non-negative integer.

18. The system of claim 17, wherein said binary compressed data comprises a sequence of binary numbers representing a set of (m, n) and a latter n bits of the sequence of binary numbers comprising said n bits of said X-bit binary signal.

19. The system of claim 18, further comprising means for storing said binary compressed data in a memory.

20. The system of claim 19, further comprising:
means for accessing said binary compressed data from said memory; and
means for decompressing said binary compressed data to recover said X-bit binary signal.

21. The system of claim 20, wherein decompressing said binary compressed data comprises:
converting one or more bits of said binary compressed data before a latter n bits of said binary compressed data to the value of m; and
recovering said binary compressed data to said X-bit binary signals in accordance with said latter n bits, the value of m and the algorithm form of $(1.n)*2^m$.

22. The system of claim 21, further comprising means for compensating a pixel corresponding to said X-bits binary signal with a bit-enhanced method at least in part by calculating a first average of a plurality of neighboring pixels around said pixel and calculating a second average of said first average and said pixel.

23. An article comprising: a computer storage media having stored thereon instructions that if executed in a microprocessor result in:
converting an X-bit binary signal to a binary compressed data in a form of $(1.n)*2^m$, wherein said X-bit binary signal is based at least in part on a signal generated by an image capture device, wherein X comprises a natural number, and wherein a bit m represents the first bit with logic level "1" of said X-bit binary signal, and n represents the bits taken from said X-bit binary signal after the bit m, and wherein n comprises a non-negative integer.

24. The article of claim 23, wherein said binary compressed data comprises a sequence of binary numbers representing a set of (m, n) and a latter n bits of the sequence of binary numbers comprising said n bits of said X-bit binary signal.

25. The article of claim 24, wherein said instructions if executed further result in storing said binary compressed data in a memory.

26. The article of claim 25, wherein said instructions if executed further result in accessing said binary compressed data from said memory at least in part for decompressing said binary compressed data to recover said X-bit binary signal.

27. The article of claim 26, wherein decompressing said binary compressed data comprises:
   converting one or more bits of said binary compressed data before a latter n bits of said binary compressed data to the value of m; and
   recovering said binary compressed data to said X-bit binary signals in accordance with said latter n bits, the value of m and the algorithm form of $(1.n)*2^m$.

28. The article of claim 27, wherein said instructions if executed further result in compensating a pixel corresponding to said X-bits binary signal with a bit-enhanced method at least in part by calculating a first average of a plurality of neighboring pixels around said pixel; and calculating a second average of said first average and said pixel.

* * * * *

UNITED STATES PATENT AND TRADEMARK OFFICE
CERTIFICATE OF CORRECTION

PATENT NO. : 7,406,203 B2
APPLICATION NO. : 11/326709
DATED : July 29, 2008
INVENTOR(S) : Shih-Zheng Kuo Page 1 of 1

It is certified that error appears in the above-identified patent and that said Letters Patent is hereby corrected as shown below:

Column 7, line 54, in Claim 11: Delete "of(l.n)*$2^m$" and insert --of (l.n)*$^2$m--, therefor; and Column 8, line 12, in Claim 15: Delete "in" and insert --m--, therefor.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,406,203 B2  Page 1 of 1
APPLICATION NO. : 11/326709
DATED : July 29, 2008
INVENTOR(S) : Shih-Zheng Kuo It is certified that error appears in the above-identified patent and that said Letters Patent is hereby corrected as shown below:

Column 7, line 54, in Claim 11: Delete "of(l.n)*$2^m$" and insert --of (l.n)*$2^m$--, therefor; and Column 8, line 12, in Claim 15: Delete "in" and insert --m--, therefor.

This certificate supersedes the Certificate of Correction issued November 30, 2010.

Signed and Sealed this
Twenty-fifth Day of January, 2011

David J. Kappos
*Director of the United States Patent and Trademark Office*